United States Patent Office 3,459,640
Patented Aug. 5, 1969

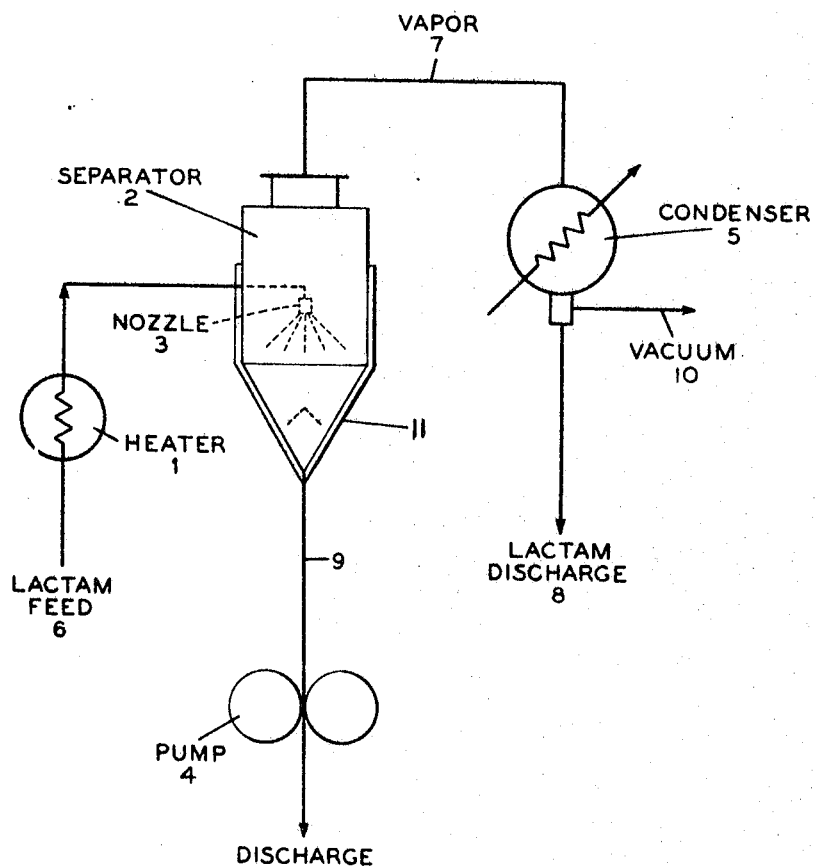

3,459,640
PROCESS FOR THE PURIFICATION OF LACTAMS
Shigemitsu Tsunawki, Mihara-shi, and Yutaka Furusawa, Hiroshima-ken, Japan, assignors to Teijin Limited, Osaka, Japan, a corporation of Japan
Filed Apr. 6, 1966, Ser. No. 540,629
Claims priority, application Japan, Apr. 8, 1965, 40/20,719
Int. Cl. B01d *3/08, 3/06*
U.S. Cl. 203—88      3 Claims

ABSTRACT OF THE DISCLOSURE

A continuous process for recovering a purified caprolactam from polycaproamide extraction solutions which comprises passing crude caprolactam to a heat exchanger and bringing to a temperature of from 100 to 260° C. and subsequently passing said heated stream into a separate vessel operated at a pressure of 10 to 50 mm. Hg and a temperature of from 150 to 300° C. wherein the purified caprolactam containing less than 0.1% oligomers passes into the overhead as a vapor which is recovered independently from the liquid portion containing up to 85% oligomers.

---

The present invention relates to a process for separating and recovering purified lactams from crude lactam solutions containing lactam and oligomers.

When fiber-forming poly-ε-caprolactam is generally produced by polymerizing ε-caprolactam (hereinafter referred to as "lactam"), the as-polymerized product contains monomer and oligomers, the amounts or quantities of each depending on the conditions of polymerization. Various methods have been proposed for removing the monomer and oligomers from the polymer produced to give a lactam containing oligomers.

Methods which have hitherto been used to remove oligomers from the recovered lactam involve precipitation, extraction, and distillation (or evaporation). In the case of precipitation, however, oligomers precipitate slowly thereby appreciably increasing the length of time required and in the case of extraction, it has been necessary to separate and recover the extracting agents used thereby adding to the cost of processing. Due to these drawbacks, therefore, it is preferred by industry to employ the distillation or evaporation method.

When oligomers are removed by means of the abovementioned distillation or evaporation procedure, it is customary to employ a vacuum rotary film evaporator in order to prevent the decomposition and polymerization of the lactam produced. However, if the amount of oligomers to be removed as high boiling matter is substantial, it is necessary to prevent their solidification by increasing the temperature of surrounding heat transfer areas. Even then oligomers are likely to deposit on the evaporator rotor due to their high viscosity, and excessive amounts of oligomer on the rotor cause it to vibrate, eventually making the operation of the evaporator extremely difficult. A simple drop diaphragm type evaporator is also undesirable, because dry spots appear on the heat transfer surface causing the temperature of said surface to increase, leading to the decomposition or polymerization of the lactam produced. The inventors have studied a process for separating the oligomers from the lactam which is free from the aforementioned shortcomings, and arrived at the present invention.

An object of the present invention is to provide a process for removing impurities from crude lactam. Other objects and advantages will be apparent from the following detailed description of the invention.

The present invention provides a process for separating purified lactam from crude lactam solutions containing lactam and oligomers which comprises forming a feed stream of said crude lactam solutions heating said feed stream to a temperature just below the boiling point of said crude solution, preferably at a temperature within the range of about 100 to 260° C. and thereafter passing said feed stream into a separating zone maintained under reduced pressure preferably at a pressure of about 10 to 50 mm. Hg and at a temperature within the range of about 100 to 300° C. wherein the feed mixture is separated into a vapor portion comprising principally pure lactam, and a liquid portion comprising said oligomers and thereafter independently recovering said vapor and liquid portion.

The process of the invention may be better understood with reference to the accompanying drawing.

The charging material which comprises crude lactam 6, for example, lactam separated from polymerized ε-caprolactam containing lactam monomer and oligomers is charged through a heater 1 wherein the feed charge is heated to a temperature below its boiling point. Generally the temperature is within a range of about 100° to 260° C., preferably 200 to 240° C. The type heater employed is a conventional electric heater. The feed stream is discharged from the heater and enters a separator 2 where it is flashed through orifices or nozzles in the separator. The temperature and pressure within the separator are maintained at a level sufficient to cause evaporation of the lactam. Generally, the pressure within the separator is subatmospheric pressure, preferably within a range of about 10 to 50 mm. of Hg abs. and the temperature within the separator is maintained within a range of about 100 to 300° C., preferably 200 to 240° C. by a Dowtherm heated jacket 11. Under these conditions, the lactam in the separator is discharged as a low boiling substance and the oligomers are separated as high boiling ingredients, namely evaporation residues. The flashing of crude lactam may be made through an ordinary open pipe disposed in the separator. However, since it is preferable to spray the crude lactam solution as uniformly and as widely as possible, it is advantageous to employ a nozzle 3 as shown in the drawing. Lactam vapors are discharged from the separator through line 7 and enter a condenser 5 wherein the lactam vapors are condensed into substantially pure lactam which is discharged from the condenser through line 8. The oligomers obtained as an evaporation residue are discharged from the separator through discharge pipe 9 by means of pump 4 and since the oligomers have a high melting point, it is desirable to heat the discharge pipe below the separator to insure that the oligomers are drained off as a liquid. The interior of the separator 2 is maintained at the prescribed vacuum level by means of vacuum pipe 10 which is connected to a vacuum source, not shown.

According to the process of the present invention, the lactam passes through the temperature zone in a short time, and does not undergo deterioration or decomposition, and can be effectively separated from the oligomers. This makes it possible to produce lactam with a good yield by purifying the recovered crude lactam, and carry out the recovery of the lactam very effectively.

With previous methods, oligomeric compositions were discharged only in the form comprising less than 50 percent of oligomers and more than 50 percent of lactam, whereas the process of the present invention makes it possible to separate these compositions in a form of more than 90 percent of which consists of oligomers.

The present invention will be understood more clearly with reference to the following examples.

EXAMPLE 1

Nylon 6 polymer obtained by polymerizing ε-caprolactam was extracted with hot water. The benzene insolubles (oligomers) contained in the crude lactam obtained by distilling off hot water used in the extraction accounted for 11.0 percent.

This crude lactam was heated to 230° C. by a preheater, and charged at the rate of 100 kg./hour into a flash evaporator maintained at a vacuum of 20 mm. Hg abs. The feed pipe extending from the preheater to the flash evaporator was provided with a nozzle of 3.0 mm. dia. at one end. The flash evaporator jacket was heated to 260° C. with a heat medium Dowtherm A. A baffle board was set up at the upper part of the flash evaporator. ε-Caprolactam and oligomers were separated almost completely in the flash evaporator, and the ε-caprolactam vapor was pumped out through the condenser at the rate of 87 kg./hour. The product thus obtained contained 0.06 percent of oligomers. The oligomers were taken out at the rate of 11 kg./hour through the tank heated to 300° C. with Dowtherm A.

EXAMPLE 2

Crude lactam containing 6.5 percent of oligomers was preheated to 230° C. and conducted into a flash evaporator evacuated to 5 mm. Hg abs. By the use of the same procedures as in Example 1, purified lactam was obtained with a yield of 98 percent (on the basis of the lactam contained in the charged materials). In this test, the flash evaporator jacket was heated to 175° C. The oligomer content of the purified lactam amounted to 0.09 percent.

Although certain preferred embodiments of the invention have been disclosed for purpose of illustration, it will be evident that various changes and modifications may be made therein without departing from the scope and spirit of the invention.

We claim:

1. A process for separating purified lactam from polycaproamide extracts containing lactam and at least 10 weight percent of total organics as oligomers which comprises feeding continuously a stream of said extracts at a temperature of between 175 and 260° C. and thereafter passing said stream in a continuous manner into a flash evaporation zone maintained under a reduced pressure of 10 to 50 mm. Hg and further heating in said flash evaporation zone to a temperature of 150 to 300° C. wherein the feed mixture is separated into an overhead vapor portion comprising principally pure lactam and a liquid portion comprising said oligomers which contains not more than 25% lactam and thereafter independently recovering said vapor and liquid portions.

2. A process according to claim 1 wherein said feed stream is heated to a temperature within the range of about 200 to 240° C. prior to passage into said flash evaporation zone and the pressure in the flash evaporation zone is maintained sufficiently low to vaporize lactam with a maximum oligomer content of .1% and leave an unvaporized oligomer residue containing not more than about 25% lactam.

3. A process according to claim 2 wherein the pressure within said flash evaporation zone is maintained within the range of about 10 to 50 mm. Hg and wherein the temperature is within the range of about 200 to 240° C. in both the preheater zone and in the flash evaporation zone and the pressure and the temperature are correlated to vaporize about 98% of the lactam and provide an oligomer residue containing not more than about 15% lactam.

References Cited

UNITED STATES PATENTS

| 2,405,969 | 8/1946 | Martin | 260—239.3 |
| 2,605,261 | 7/1952 | Kahr | 260—239.3 |
| 2,667,483 | 1/1954 | Zeegerg | 260—239.3 |
| 3,156,683 | 11/1964 | Chandler | 260—239.3 |

FOREIGN PATENTS

| 757,406 | 9/1956 | Great Britain. |
| 850,437 | 10/1960 | Great Britain. |
| 1,317,839 | 1/1963 | France. |

NORMAN YUDKOFF, Primary Examiner

DAVID EDWARDS, Assistant Examiner

U.S. Cl. X.R.

203—90; 260—239